US008249141B1

(12) United States Patent
Harris et al.

(10) Patent No.: US 8,249,141 B1
(45) Date of Patent: Aug. 21, 2012

(54) METHOD AND SYSTEM FOR MANAGING BANDWIDTH BASED ON INTRAFRAMES

(75) Inventors: David L. Harris, Pleasanton, CA (US); Claudio R. Lima, San Jose, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 1435 days.

(21) Appl. No.: 11/777,786

(22) Filed: Jul. 13, 2007

(51) Int. Cl.
*H04N 7/12* (2006.01)

(52) U.S. Cl. ............. 375/240.01; 375/240; 375/240.02; 382/232; 382/236; 382/239

(58) Field of Classification Search .................. 375/240, 375/240.01, 240.02; 382/232, 236, 239
See application file for complete search history.

(56) References Cited

U.S. PATENT DOCUMENTS

| | | | | | |
|---|---|---|---|---|---|
| 5,231,492 | A | * | 7/1993 | Dangi et al. ............... 348/14.12 |
| 5,388,097 | A | * | 2/1995 | Baugher et al. ............. 370/455 |
| 5,519,435 | A | * | 5/1996 | Anderson ....................... 725/92 |
| 5,726,711 | A | | 3/1998 | Boyce |
| 6,160,846 | A | * | 12/2000 | Chiang et al. ............. 375/240.05 |
| 6,452,933 | B1 | * | 9/2002 | Duffield et al. ............... 370/415 |
| 6,489,989 | B1 | * | 12/2002 | Shapiro et al. ................. 348/180 |
| 6,570,606 | B1 | | 5/2003 | Sidhu et al. |
| 6,618,507 | B1 | | 9/2003 | Divakaran et al. |
| 6,646,676 | B1 | | 11/2003 | DaGraca et al. |
| 6,924,832 | B1 | | 8/2005 | Shiffer et al. |
| 7,039,715 | B2 | * | 5/2006 | England et al. ............... 709/232 |
| 2002/0126130 | A1 | * | 9/2002 | Yourlo .......................... 345/582 |
| 2003/0039308 | A1 | * | 2/2003 | Wu et al. .................... 375/240.12 |
| 2005/0063404 | A1 | * | 3/2005 | Karaoguz et al. ............. 370/418 |
| 2005/0147162 | A1 | * | 7/2005 | Mihara ..................... 375/240.03 |
| 2006/0104345 | A1 | * | 5/2006 | Millar et al. ............. 375/240.01 |
| 2006/0130104 | A1 | * | 6/2006 | Budagavi ....................... 725/105 |
| 2006/0140270 | A1 | * | 6/2006 | Li et al. ..................... 375/240.12 |
| 2006/0146780 | A1 | * | 7/2006 | Paves ............................. 370/348 |
| 2006/0184670 | A1 | * | 8/2006 | Beeson et al. ................. 709/224 |
| 2007/0064604 | A1 | * | 3/2007 | Chen et al. .................... 370/230 |
| 2007/0133942 | A1 | * | 6/2007 | Moors et al. ..................... 386/68 |
| 2007/0268367 | A1 | * | 11/2007 | Agmon .......................... 348/143 |
| 2007/0280298 | A1 | * | 12/2007 | Hearn et al. ................... 370/498 |
| 2008/0239075 | A1 | * | 10/2008 | Mehrotra et al. ............. 348/143 |
| 2010/0040134 | A1 | * | 2/2010 | Sun .......................... 375/240.01 |
| 2010/0097473 | A1 | * | 4/2010 | Park et al. ..................... 348/159 |
| 2010/0226262 | A1 | * | 9/2010 | Liu et al. ....................... 370/252 |

OTHER PUBLICATIONS

Jiang et al. "A Scene Complexity Adaptive Intra-Frame Rate Control for Video Coding." 2010 International Conference on Multimedia Communications. Aug. 7-8, 2010. pp. 108-111.*

(Continued)

*Primary Examiner* — Nathan Flynn
*Assistant Examiner* — Sarah Su

(57) ABSTRACT

A method and system of managing QoS for a plurality of video capture devices coupled to a common communication link. A CU coupled between the video capture devices and the communication link may provide each video capture device a respective level of QoS over the communication link. The CU may then receive a video stream from a given video capture device. Thereafter, the CU may detect a predefined minimum threshold rate of intraframes in the video stream and responsively adjust QoS over the communication link to increase a respective level of QoS provided to the given video capture device. In turn, the CU may send the video stream over the communication link with the increased respective level of QoS. Subsequently, the CU may adjust QoS over the communication link to decrease a respective level of QoS provided to the given video capture device.

22 Claims, 4 Drawing Sheets

OTHER PUBLICATIONS

Tsai et al. "Scene Change Aware Intra-Frame Rate Control for H.264/AVC." IEEE Transactions on Circuits and Systems for Video Technology. vol. 20, No. 12, Dec. 2010. pp. 1882-1886.*

Comtech EF Data Vipersat Networks Product Group, "Bandwidth and Capacity Management of IP Networks Over Satellite," pp. 1-63 (Nov. 2006).

* cited by examiner

METHOD AND SYSTEM FOR MANAGING BANDWIDTH BASED ON INTRAFRAMES

FIELD OF THE INVENTION

The present invention relates to video streaming, and more particularly to managing quality of service (QoS) for video streaming over a communication link.

BACKGROUND

The art and popularity of digital video has grown significantly over recent years. Digital video, which represents and stores video signals in a digital format, may provide various benefits over analog video. For example, digital video may provide improved video quality over analog video. As another example, digital video may be easier to store, reproduce, and transport over a network such as the Internet. As yet another example, digital video may be easier to search, edit, and/or analyze. Many other benefits exist as well. Because of these benefits, digital video is becoming the preferred solution for video surveillance.

Most digital video formats use video compression to reduce the quantity of data used to represent captured video content, thus reducing network resources required to transport the video content. Captured video content is basically a three-dimensional array of color pixels. Two dimensions serve as spatial (i.e., horizontal and vertical) directions of the video content, and one dimension represents the time domain. A frame is a set of all pixels that correspond to a single point in time, and is basically equivalent to a still picture. Typically, a large amount of data in a video frame is unnecessary for achieving good perceptual quality. As such, video compression is typically lossy, meaning that at least some data from a video frame is discarded during compression.

Further, captured video content often contains spatial and temporal redundancy from one frame to another. As such, the captured video content may be encoded by registering the similarities and/or differences between frames. In this respect, video compression standards may encode the captured video content using different frame types, known generally as intraframes and interframes, that indicate the encoding of the frames. For example, MPEG standards may encode captured video content using intraframes known as intra-coded frames (I-frames) and interframes known as predictive-coded frames (P-frames) and bidirectionally-predictive-coded frames (B-frames).

Intraframes are simply compressed versions of uncompressed raw frames of the captured video content. As such, intraframes are encoded without reference to other frames in the captured video content, and intraframes typically require more data to encode than other frame types. Often times, intraframes are necessary when differences between frames in video content make it impractical to reference other frames in the video content, such as when significant movement occurs in the captured video content.

Interframes take advantage of the redundancy between frames and basically encode the differences between a current frame and preceding and/or subsequent frames in captured video content. As such, interframes reference other frames in the video content, and require prior decoding of the referenced frames before the interframes can be decoded. Interframes may contain frame data for the captured video content and/or motion vector displacements representing frame differences. Interframes typically require less data to encode than intraframes, because interframes copy data from other encoded frames. In this respect, the size of interframes is typically proportional to an amount of difference between the frames in captured video content.

The different frame types may then he arranged in "groups of pictures" (GOPs), each of which typically begins with an intraframe and ends just before the next intraframe. One common arrangement for a GOP according to an MPEG standard is the fifteen-frame sequence IBBPBBPBBPBBPBB. One or more consecutive GOPs may then form an encoded video stream. As can be readily seen, the amount of data, and thus the data rate, of the encoded video stream will vary depending on the frame types used to encode the captured video content. For example, if the video stream includes a higher rate of intraframes (e.g., if there is frequent movement in the captured video content), the video stream may have a higher data rate. Alternatively, if the video stream includes a lower rate of intraframes (e.g., if there is only infrequent movement in the captured video content), the video stream may have a lower data rate.

As noted above, one benefit of digital video is that it can be transported over a network more efficiently than analog video. For example, digital video may be sent over a network using the well-known TCP/IP protocol. In this respect, video content from multiple remote locations may be aggregated at a central network entity by placing network-enabled video capture devices at the remote locations and then sending the video content from the video capture devices via the network to the central network entity. In one example, the central network entity may he a storage device, such as a network server, that archives the video content. Additionally, the central network entity may be connected to a client station, such as a personal computer, that is arranged to receive and display the video content. In this respect, the video content may be streaming video content that the client station receives and displays in real-time.

The communication links between the remote locations and the network, which carry video content to the network, may take a variety of forms. For example, the communication links may be wireline links, such T1 and/or E1 lines. As another example, the communication links may be wireless links, such as satellite links. Other examples are possible as well.

Unfortunately, these communication links, which may be referred to as "backhaul" links, often suffer from limited capacity. In turn, the limited capacity of the backhaul may limit the QoS provided to video capture devices at a given remote location, thus impacting the quality and/or quantity of video content sent from video capture devices to the network. This is especially a concern with streaming video, which is highly time-sensitive. Further, the limited capacity of backhaul links is often divided equally between video capture devices in a fixed manner, and thus does not efficiently track the varying data rates of video streams produced by the video capture devices. Further yet, the limited capacity of backhaul links is often expensive. Accordingly, there is a need for a system and/or method that efficiently manages the limited capacity of a communication link connected to video capture devices at remote locations.

SUMMARY

The present invention is directed to an innovative method and system of managing QoS for a plurality of video capture devices coupled to a common communication link. The invention is particularly well suited for use where the communication link couples video capture devices at a remote location to a centralized network. However, the invention may apply in other scenarios as well.

According to an example of the present invention, a control unit (CU) may be coupled between the video capture devices and the communication link. The CU may provide each video capture device a respective level of QoS over the communication link, such as by allocating a respective amount of bandwidth to each video capture device. The CU may then receive a first video stream from a first video capture device. The first video stream will preferably be encoded in a compressed digital format, such as an MPEG format.

While receiving the first video stream, the CU may detect a predefined minimum threshold rate of intraframes in the first video stream. More particularly, the CU 20 may (i) calculate a rate of intraframes in the first video stream and (ii) compare the calculated rate of intraframes in the first video stream to the predefined minimum threshold rate of intraframes, to determine whether the calculated rate of intraframes exceeds the predefined minimum threshold rate of intraframes. An intraframe rate that exceeds (or, equally, meets) the predefined minimum threshold intraframe rate may indicate an increased data rate of the first video stream, and thus a need for an increased level of QoS. As such, in response to detecting the predefined minimum threshold rate of intraframes, the CU may adjust the QoS over the communication link to increase a respective level of QoS provided to the first video capture device.

After increasing the respective level of QoS provided to the first video capture device, the CU may then send the first video stream over the communication link with the increased respective level of QoS. Further, the CU may subsequently adjust the QoS over the communication link to decrease a respective level of QoS provided to the first video capture device, such as when an intraframe rate of the first video stream no longer exceeds the predefined minimum threshold intraframe rate.

In summary, in accordance with one aspect, an exemplary embodiment of the present invention may take the form of a method of managing QoS for a plurality of video capture devices coupled to a common communication link. The method may involve (a) providing each of the plurality of video capture devices a respective level of QoS over the communication link, (b) receiving a first video stream from a first video capture device of the plurality of video capture devices, wherein the first video stream comprises one or more frames, (c) detecting a predefined minimum threshold rate of intraframes in the first video stream, and (d) in response to detecting the predefined minimum threshold rate of intraframes, adjusting QoS over the communication link to increase a respective level of QoS provided to the first video capture device. Additionally, the method may involve (e) sending the first video stream over the communication link with the increased respective level of QoS.

The function of detecting a predefined minimum threshold rate of intraframes in the first video stream may include (i) calculating a rate of intraframes in the first video stream, and (ii) comparing the calculated rate of intraframes in the first video stream to the predefined minimum threshold rate of intraframes. In this respect, the function of calculating a rate of intraframes in the first video stream may include determining a first number of intraframes received during a given time period, determining a second number of all frames received during the given time period, and dividing the first number by the second number. Further, the function of comparing the calculated rate of intraframes in the first video stream to the predefined minimum threshold rate of intraframes may occur only after first receiving a minimum threshold number of frames of the first video stream.

The function of detecting a predefined minimum threshold rate of intraframes in the first video stream may also include detecting a predefined number of consecutive intraframes in the first video stream.

The function of adjusting the QoS over the communication link to increase a respective level of QoS provided to the first video capture device may include (i) decreasing a respective level of QoS provided to a second video capture device by a given amount; wherein the second video capture device produces a second video stream, and (ii) correspondingly increasing the respective QoS provided to the first video capture device by the given amount. In this respect, the given amount may be a predefined amount, an amount in proportion to a rate of intraframes in the first video stream, and/or an amount in proportion to a rate of intraframes in the second video stream.

As examples, the function of adjusting the QoS over the communication link to increase a respective level of QoS provided to the first video capture device may include (i) reallocating bandwidth of the communication link to increase a respective amount of bandwidth allocated to the first video capture device, (ii) increasing a level of priority provided to the first video capture device, and/or (iii) adjusting capture settings of the first video capture device. In this respect, the function of reallocating bandwidth of the communication link to increase a respective amount of bandwidth allocated to the first video capture device may include deallocating a given amount of bandwidth from a second video capture device and correspondingly allocating the given amount of bandwidth to the first video capture device. Additionally or alternatively, the function of reallocating bandwidth of the communication link to increase a respective amount of bandwidth allocated to the first video capture device may include allocating an unallocated amount of the bandwidth of the communication link to the first video capture device.

The method may additionally involve subsequently adjusting the QoS over the communication link to decrease the level of QoS provided to the first video capture device. For example, the method may include (i) determining that the predefined minimum threshold rate of intraframes has not been detected in the first video stream during a predefined time period, and (ii) responsively adjusting the QoS over the communication link to decrease the level of QoS provided to the first video capture device.

As another example, the method may include (i) receiving a second video stream from a second video capture device, (ii) detecting a predefined minimum threshold rate of intraframes in the second video stream, and (iii) in response to detecting the predefined minimum threshold rate of intraframes in the second video stream, adjusting the QoS over the communication link to increase a respective level of QoS provided to the second video capture device and decrease the respective level of QoS provided to the first video capture device.

As yet another example, the method may include (i) receiving a second video stream from a second video capture device of the plurality of video capture devices, (ii) determining that a rate of intraframes in the second video stream exceeds a rate of intraframes in the first video stream, (iii) in response to determining that the rate of intraframes in the second video stream exceeds the rate of intraframes in the first video stream, adjusting the QoS over the communication link to increase a respective level of QoS provided to the second video capture device and decrease the respective level of QoS provided to the first video capture device.

In another aspect, an exemplary embodiment of the invention may take the form of a CU. The CU may include (a) a first communication interface for communication with a plurality of video capture devices, (b) a second communication interface for communicating with a network via a communication link, (c) a processor, (d) data storage, and (e) program instructions stored in the data storage and executable by the processor to carry out various functions, such as the functions described above for instance. In this aspect, the video capture devices may be digital camcorders, and the communication link may be a wireless satellite link.

In yet another aspect, an exemplary embodiment of the invention may take the form of a communication system. The communication system may include (a) a plurality of camera devices, (b) a network, and (c) a control unit. The control unit may be communicatively coupled to the network via a communication link and to the plurality of camera devices, and the control unit may then be operable to carry out various functions, such as the functions described above for instance.

The control unit may include a video processing device communicatively coupled to a QoS management device. In this respect, the video processing device may be communicatively coupled to the plurality video capture devices, and the QoS management device may be communicatively coupled to the network via the communication link and to the plurality of camera devices. The video processing device and the QoS management device may then be operable to carry out various functions as described herein.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
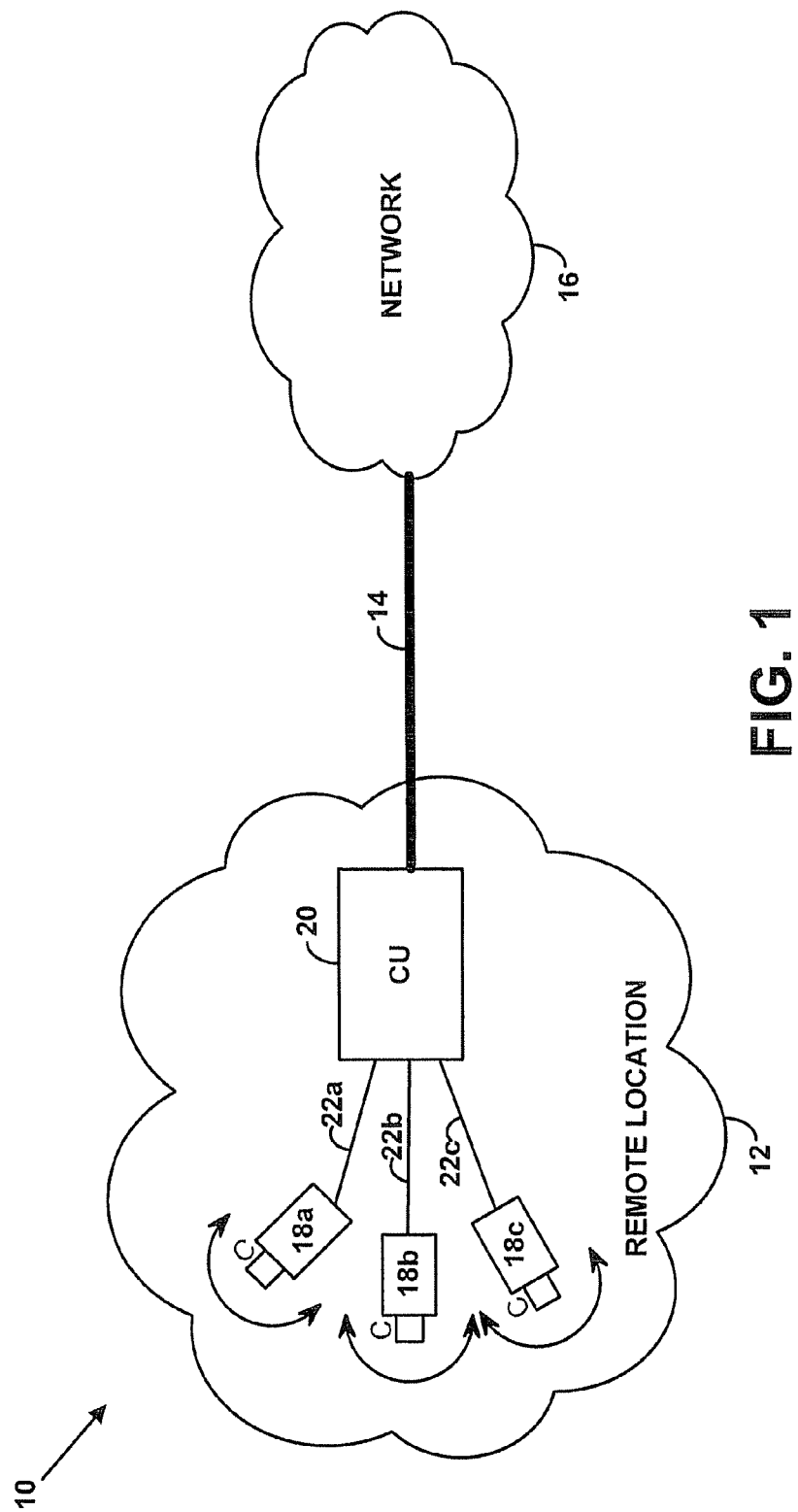
FIG. 1 is a simplified block diagram of a communication system in which an exemplary embodiment of the invention can be implemented.

Referring to the drawings, FIG. 1 is a simplified block diagram of a communication system 10 in which an exemplary embodiment of the invention can be implemented. As shown, the system 10 includes a remote location 12 connected to a network 16 via a communication link 14.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As one example, the remote location 12 may be a single building, such as a home, an office, a school, etc. In this respect, the remote location may include the building and the area surrounding the building. As another example, the remote location 12 may be a group of buildings, such as a subdivision of homes, an office park, etc. As yet another example, the remote location 12 may be an outdoor location, such as a roadway. Many other examples of remote locations 12 exist as well.

As shown in FIG. 1, the remote location 12 may include a plurality of video capture devices 18 coupled to a control unit (CU) 20 via links 22. The remote location 12 may also include other communication devices, such as computers, telephones, and/or servers (not shown) for instance. In this respect, the devices of the remote location 12, including the CU 20 and the video capture devices 18, may be connected together to form a local area network (LAN). Further, as shown, the CU 20 may communicatively couple the remote location 12 to the network 16 via the communication link 14. In this respect, the CU 20 may be communicatively coupled to an external network transceiver (not shown), such as a microware radio or satellite transceiver, which may in turn communicatively couple the remote location 12 to the network 16 via the communication link 14.

The video capture devices 18 may primarily function to capture and record video content and engage in communication with the CU 20. As such, each of the video capture devices 18 may include a lens, an imager (e.g., a CCD or CMOS sensor), and a recorder. Preferably, the video capture devices 18 will record the video content in a compressed digital format (e.g., MPEG-2, MPEG-4, etc.). Alternatively, the video capture devices 18 may record the video content in analog and/or uncompressed digital format, in which case the video capture devices 18 may be connected to additional components that convert the analog video content to digital and/or compress/encode the digital video content. The components and/or recording formats of the video capture devices 18 may also define capture settings for the video capture devices 18, such as resolution and/or frame rate. Examples of the video capture devices 18 include digital camcorders and/or cellular telephones with video-capture capability. Other examples are possible as well.

The CU 20 may be coupled to the video capture devices 18 via links 22 and the network 12 via the communication link 14 (and optionally via an external network transceiver). As such, the CU 20 may facilitate communication between the video capture devices 18 and the network 16 over the communication link 14. Further, the CU 20 may control the video capture devices 18 and manage communication between the video capture devices 18 and the network 16 over the communication link 14, as described in more detail below. As an example, the CU 20 may be one or more programmable computers that are arranged to carry out the above functions.

The links 22 may be any wireline and/or wireless links that carry communications between the video capture devices 18 and the CU 20. For example, the links 22 may be twisted-pair cables, coaxial cables, and/or optical fiber cables that carry communications compliant with an Ethernet protocol, a digital video interface standard (e.g., SDI, HDMI, DVI, etc.), and/or a serial bus standard (e.g., Firewire, USB 2.0, etc.). As yet another example, the links 22 may be wireless air interface links that carry communications compliant with cellular protocols (e.g., CDMA, TDMA, WiMAX, GSM, GRPS, UMTS, EDGE, LTE, etc.), Wi-Fi protocols (e.g., 802.11x), and/or wireless personal area network (WPAN) protocols (e.g., Bluetooth, UWB, etc.). Other examples are possible as well.

The communication link 14, which may be referred to as a "backhaul" link, may be any wireline and/or wireless link that carries communications between the remote location 12 and the network 16. As an example, the communication link 14 may be a twisted-pair cable, a coaxial cable, and/or an optical fiber cable that functions as a T1/E1 link and/or a SONET/SDH link. As another example, the communication link 14 may be a wireless air interface link that functions as microwave radio link (e.g., WiMAX, LMDS, etc.) and/or a satellite link. Other examples are possible as well, including the possibility that the communication link 14 includes multiple physical links that are networked together. The communication link 14 may carry communications between the remote location 12 and the network 16 according to a variety of protocols, including IP over Ethernet, IP over ATM, IP over PPP, IP over TDM, and/or IP over IP with GRE tunneling.

The communication link 14 will have a given capacity, which dictates a maximum data rate (i.e., bandwidth or throughput) the communication link 14 can support at any given time. The communication link's given capacity may be shared between the video capture devices 18 at the remote location 12. For example, video content from the video capture devices 18 may be multiplexed (e.g., via time-division, frequency, and/or statistical multiplexing) onto the communication link 14. As such, the remote location 12, via the CU 20, may provide each video capture device 18 a respective level of QoS over the communication link 14, which governs each video capture device's level of access to the given capacity of the communication link 14. For example, a given video capture device's respective level of QoS may define a respective amount of bandwidth allocated to the given video capture device. As another example, a given video capture device's respective level of QoS may define a respective level of priority provided to the given video capture device. As yet another example, a given video capture device's respective level of QoS may define respective capture settings of the given video capture device. Other examples are possible as well.

The network 16 may then function to facilitate communication between the remote location 12 and various other system entities, including client stations and/or servers. The network 16 may include, for example, a packet-switched network (e.g., the Internet), a circuit-switched network (e.g., public switched telephone network (PSTN)), a signaling network (e.g., a Signaling System #7 (SS7)), and/or a radio access network (RAN). The network 16 may also include other entities, such as networking devices (e.g., gateways, switches, bridges, and/or routers).

Preferably, the network 16 will include at least a packet-switched network that facilitates packet-based communication. The packet-switched network may include one or more local area networks (LANs) and/or one or more wide area networks (WANs), such as the Internet. The packet-switched network 12 may route packets based on network addresses, such as by using the Internet Protocol (IP) protocol in combination with the User Datagram Protocol (UDP) and/or Transmission Control Protocol (TCP). In turn, the packet-switched network may carry data in various foiinats, including media streaming protocols such as the real-time streaming protocol (RTSP), the real-time transport protocol (RTP), and/or the RTP control protocol (RTCP). Packet-based communication over the packet-switched network 16 may take other foul's as well.

With the general arrangement described above, client stations and/or servers coupled to the network 16 may receive video content captured by the video capture devices 18 at the remote location 12 over a path that includes the links 22, the CU 20, the communication link 14, and the network 16. In turn, the client stations and/or servers may store the video content for future reference. Further, the client stations may display the video content for viewing by a user, either in real-time or at a later time. Accordingly, the system 10 may enable a user to simultaneously view real-time video content from multiple video capture devices 18 at the remote location 12, as well as other remote locations.

Figure 2:
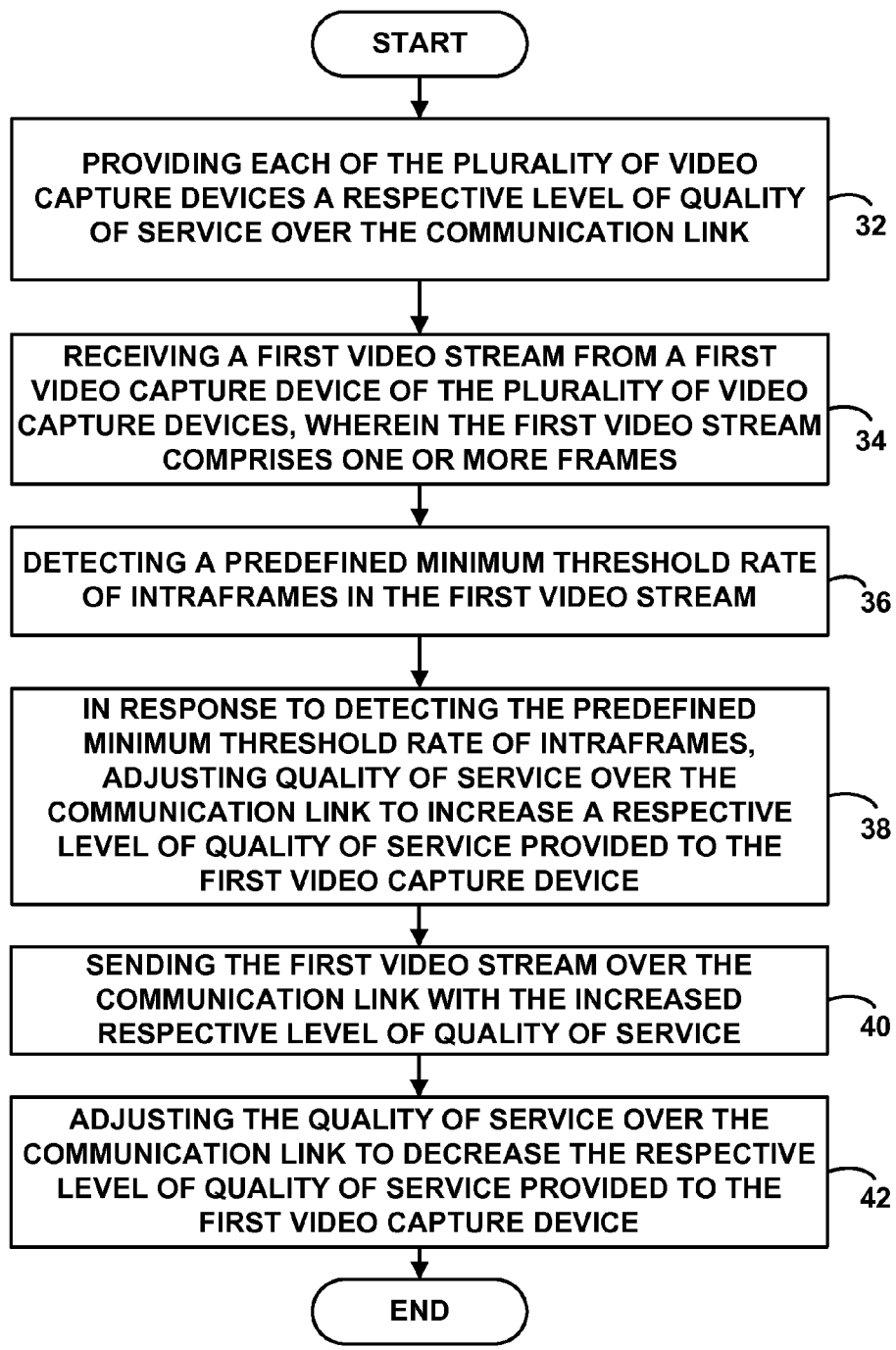
FIG. 2 is a flow chart depicting a method of managing QoS for a plurality of video capture devices coupled to a common communication link, according to the exemplary embodiment.

FIG. 2 is a flow chart depicting a method of managing QoS for the plurality of video capture devices 18 coupled to the common communication link 14, according to an exemplary embodiment of the present invention. As described above, the video capture devices 18 may be coupled to the communication link 14 via the CU 20, and as such the CU 20 will preferably carry out the method described herein.

At step 32, the CU 20 may provide each of the video capture devices 18 a respective level of QoS over the communication link 14. For example, as described above, the CU 20 may allocate a respective amount of bandwidth of the communication link 14 to each of the video capture devices 18, such as by assigning each video capture device 18 time slots and/or frequency segments on the communication link 14. In this respect, the CU 20 may provide each video capture device 18 with an equal amount of bandwidth, or the CU 20 may provide different bandwidth amounts to different video capture devices 18. As another example, the CU 20 may provide a respective level of priority to each of the given video capture devices 18. The level of priority of the video capture devices 18 may then dictate the order in which video content from different video capture devices 18 is sent over the communication link 14. As yet another example, the CU 20 may dictate respective capture settings for each of the video capture devices 18, such as by instructing the video capture devices 18 via signaling messages. Other examples are possible as well.

At step 34, the CU 20 may receive a first video stream (i.e., a series of video frames) from a first video capture device 18a via link 22a. Preferably, the first video stream will be in a compressed digital format. In this respect, the first video stream may be encoded according to a variety of standards. For example, the first video stream may be encoded according to an MPEG standard (e.g., MPEG-1, MPEG-2, MPEG-3, MPEG-4, etc.), a VCEG standard (e.g., H.261, H.262, H.263, H.264, etc.), a Windows Media Video (WMV) standard, or any other encoding standard now known or later developed. Regardless of the encoding standard, the first video stream will preferably include intraframes and/or interframes. For example, if the first video stream is encoded according to an MPEG standard, the first video stream may contain I-frames, P-frames, and/or B-frames. Other examples are possible as well.

At step 36, the CU 20 may detect a predefined minimum threshold rate of intraframes in the first video stream. The predefined minimum threshold intraframe rate may depend on a variety of factors, including the maximum capacity of the communication link 14 and/or the capture settings of the first video capture device 18a (e.g., resolution, frame rate, etc). In this respect, the predefined minimum threshold intraframe rate may remain constant during system operation, or the predefined minimum threshold intraframe rate may vary during system operation based on the factors described above. Further, the predefined minimum threshold intraframe rate may be defined and/or adjusted automatically by entities of the system 10, or the predefined minimum threshold intraframe rate may be defined and/or adjusted by a user, such as a network administrator. Preferably, the predefined minimum threshold intraframe rate will be at least 10% of the frames in the first video stream.

In one example, the CU 20 may detect the predefined minimum threshold rate of intraframes in the first video stream by (i) calculating a rate of intraframes in the first video stream and (ii) comparing the calculated rate of intraframes in the first video stream to the predefined minimum threshold rate of intraframes, to determine whether the calculated rate of intraframes exceeds (or, equally, meets) the predefined minimum threshold rate of intraframes. An intraframe rate that exceeds the predefined minimum threshold intraframe rate may indicate an increased data rate of the first video stream, and thus a need for an increased level of QoS for the first video stream.

The CU 20 may calculate the rate of the intraframes in the first video stream by dividing a number of intraframes received during a given time period by a number of all frames received during the time period. For example, the CU 20 may calculate the rate of the intraframes in the first video stream by dividing a total number of received intraframes by a total number of all received frames. As another example, the CU 20 may calculate the rate of the intraframes in the first video stream by dividing a number of intraframes received in the last 60 seconds by a number of all frames received in the last 60 seconds. In this respect, the CU 20 may focus on a more recent intraframe rate of the first video stream. Regardless of the method used to calculate the intraframe rate of the first video stream, the CU 20 may update this calculation continuously (e.g., after receiving each new frame of the first video stream), periodically (e.g., every 1s, every 60 frames, etc.), or in response to some triggering event (e.g., receiving consecutive intraframes).

Further, while the CU 20 will preferably begin calculating the intraframe rate shortly after receiving a first frame of the first video stream, the CU 20 may begin comparing the calculated intraframe rate to the predefined minimum threshold intraframe rate only after first receiving a given number of frames of the first video stream. The given number of frames will preferably be greater than 1 frame, such that the CU 20 allows the intraframe rate of the first video stream to stabilize before the CU 20 attempts to detect the predefined minimum threshold intraframe rate in the first video stream.

In another example, the CU 20 may detect the predefined minimum threshold rate of intraframes in the first video stream by detecting a predefined minimum threshold number of consecutive intraframes in the first video stream. The predefined minimum threshold number of consecutive intraframes may depend on a variety of factors, including the maximum capacity of the communication link 14 and the capture settings of the first video capture device 18*a* (e.g., resolution, frame rate, etc). In this respect, the predefined minimum threshold number of consecutive intraframes may remain constant during system operation, or the predefined minimum threshold number of consecutive intraframes may vary during system operation based on the factors described above. Further, the predefined minimum threshold number of consecutive intraframes may be defined and/or adjusted automatically by entities of the system 10, or the predefined minimum threshold may be defined and/or adjusted by a user, such as a network administrator. Preferably, the predefined minimum threshold number of consecutive intraframes will he at least 3 intraframes.

At step 38, in response to detecting the minimum threshold rate of interframes in the first video stream, the CU 20 may then adjust the QoS over the communication link 14 to increase a respective level of QoS provided to the first video capture device 18*a*. In this respect, the CU 20 may decrease a respective level of QoS provided to a second video capture device 18*b* by a given amount, and then correspondingly increase the respective QoS provided to the first video capture device 18*a* by that given amount. The given amount of decrease/increase may be a predefined amount, or may be in proportion to an intraframe rate of the first video stream and/or a second video stream produced by the second video capture device. In either case, the CU 20 may stop decreasing the respective level of QoS provided to a second video capture device 18*b* and/or increasing the respective level of QoS provided to the first video capture device 18*a* if the respective levels of QoS reach predefined threshold levels of QoS.

As one example, the CU 20 may adjust the QoS over the communication link 14 to increase the respective level of QoS provided to the first video capture device 18*a* by reallocating the bandwidth of the communication link 14 to increase a respective amount of bandwidth allocated to the first video capture device 18*a*. In this respect, the CU 20 may reallocate the bandwidth by (i) deallocating a given amount of bandwidth from a second video capture device 18*b*, and (ii) correspondingly allocating the given amount of bandwidth to the first video capture device 18*a*. Alternatively or additionally, the CU 20 may reallocate the bandwidth by allocating an unallocated amount of bandwidth of the communication link 14 to the first video capture device 18*b*.

The CU 20 may reallocate the bandwidth of the communication link 14 in a variety of ways, depending on the type of multiplexing used to transmit video content over the communication link 14. For example, if TDM is used to transmit video content over the communication link 14, the CU 20 may reallocate the bandwidth by reassigning time slots of the communication link 14. As another example, if FDM is used to transmit video content over the communication link 14, the CU 20 may reallocate the bandwidth by reassigning frequency segments of the communication link 14. Other examples are possible as well.

The CU 20 may also adjust the QoS over the communication link 14 to increase the respective level of QoS provided to the first video capture device 18*a* by increasing a level of priority provided the first video capture device 18*a*. In this respect, the CU 20 may then send the first video capture device's video content over the communication link 14 to the network 16 before sending video content from lower priority video capture devices 18.

The CU 20 may additionally adjust the QoS over the communication link 14 to increase the respective level of QoS provided to the first video capture device 18*a* by adjusting capture settings of the first video capture device 18*a*, such as the resolution and frame rate of the video capture device 18*a*. In this respect, the CU 20 may send signaling messages to the video capture device 18*a* over the link 22*a* to adjust the capture settings.

At step 40, the CU 20 may then send the first video stream over the communication link 14 with the increased respective level of QoS. In this respect, the CU 20 may temporarily store the first video stream while the CU 20 adjusts the QoS over the communication link 14. Alternatively, the CU 20 may send a first portion of the first video stream with the original respective level of QoS, and then send a second portion of the first video stream with the increased respective level of QoS.

At step 42, the CU 20 may subsequently adjust the QoS over the communication link 14 to decrease the respective level of QoS provided to the first video capture device 18*a*. In this respect, the CU 20 may decrease the respective level of QoS provided to the first video capture device 18*a* in proportion to a rate of intraframes in the first video stream, or the CU 20 may decrease the respective level of QoS provided to the first video capture device 18*a* by a predefined amount. In either case, the CU 20 may stop decreasing the respective level of QoS provided to the first video capture device 18*a* after the respective level of QoS reaches a predefined minimum threshold level of QoS As one example, the CU 20 may adjust the QoS over the communication link 14 to decrease the respective level of QoS provided to the first video capture device 18*a* in response to determining that the predefined minimum threshold rate of intraframes has not been detected in the first video stream (e.g., the intraframe rate has not exceeded the predefined minimum threshold intraframe rate) during a predefined time period. For example, the CU 20 may decrease the respective level of QoS provided to the first video capture device 18*a* if the intraframe rate of the first video stream has not exceeded the predefined minimum threshold intraframe rate for 30 seconds.

As another example, the CU 20 may adjust the QoS over the communication link 14 to decrease the respective level of QoS provided to the first video capture device 18*a* in response to (i) receiving a second video stream from a second video capture device 18*b* and (ii) either detecting a predefined minimum threshold rate of intraframes in the second video stream or determining that a rate of intraframes in the second video stream exceeds a rate of intraframes in the first video stream. In this example, the CU 20 may also adjust the QoS over the communication link 14 to increase a respective level of QoS provided to the second video capture device 18*b*.

Advantageously, the present method may provide a more efficient use of the communication link for carrying video content from video capture devices, because the QoS over the communication link is dynamically adjusted based on the needs of the video capture devices. More particularly, the present method may determine that a given video capture device is producing a video stream with an increased intraframe rate, which indicates an increased data rate of the video stream. In turn, the present method may dynamically adjust the QoS over the communication link to increase the level of QoS provided to the given video capture device, such that the quality of the increased data rate video stream in not degraded as it travels over the communication link to the network. This increase in level of QoS for the first video capture device may be facilitated by a corresponding decrease in levels of QoS for other video capture devices that are not fully using their respective levels of QoS, and as such the quality of other video streams should not suffer.

Figure 3:
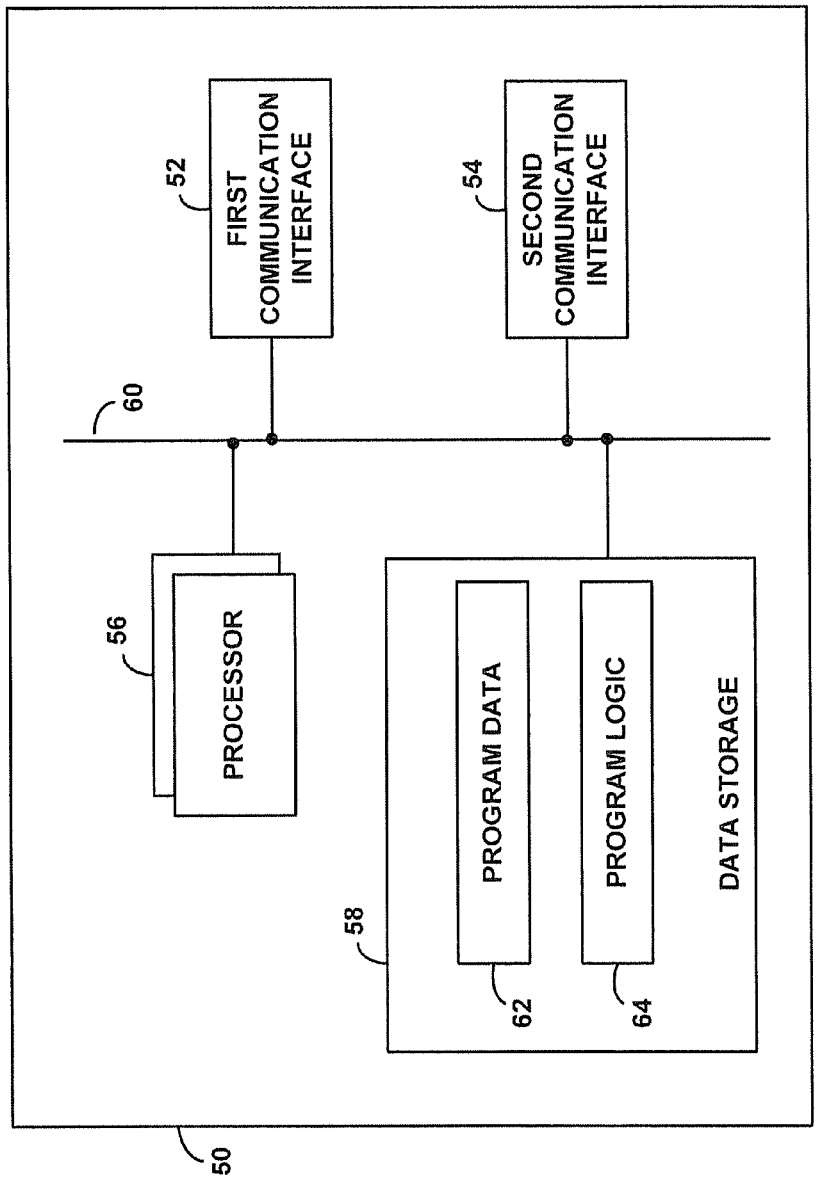
FIG. 3 is a simplified block diagram of a first exemplary control unit, showing functional components that can operate to carry out aspects of the exemplary embodiment.

The functionality of the present invention may be implemented in one or more entities of the system 10. Preferably, as described above, the CU 20 at the remote location 12 may carry out the functions of the present invention. As such, FIG. 3 is a simplified block diagram of a first exemplary CU 50, showing functional components that can operate to carry out aspects of the present invention. As shown, the first exemplary CU 50 may include, without limitation, a first communication interface 52, second communication interface 54, processor 56, and data storage 58, all interconnected by a system bus or other connection mechanism 60.

The first communication interface 52 preferably functions to communicatively couple the first exemplary CU 50 to the video capture devices 18. As such, the first communication interface 52 may include an Ethernet network interface card, a digital video interface (e.g., SDI, HDMI, DVI, etc.), a serial bus interface (e.g., Firewire, USB 2.0, etc.), a chipset and antenna adapted to facilitate wireless communication according a desired protocol, and/or any other form that provides for wireless and/or wired communication with video capture devices 18. Preferably, the first communication interface 52 will include multiple communication interfaces, each corresponding to a different video capture device 18.

The second communication interface 54 preferably functions to communicatively couple the CU 20 to the network 16 via the communication link 14. As such, the communication interface 54 may include an Ethernet network interface card, a microwave radio transceiver (e.g., a base transceiver station (BTS)), a satellite transceiver, and/or any other form that provides for wireless and/or wired communication with the network 16 via the communication link 14. Alternatively, the second communication interface 54 may communicatively couple the CU 20 to an external network transceiver (not show) at the remote location 12, which in turn communicatively couples the remote location 12 to the network 16 via the communication link 14. In this respect, the second communication interface 54 may include an Ethernet network interface card, a chipset and antenna adapted to facilitate wireless communication according a desired protocol (e.g., a short-range wireless protocol such as Wi-Fi), and/or any other form that provides for wireless and/or wired communication with the external transceiver. In either case, the second communication interface 54 may also include multiple communication interfaces.

The processor 56 may comprise one or more general purpose microprocessors and/or dedicated signal processors. (The term "processor" encompasses either a single processor or multiple processors that could work in combination.) Data storage 58, in turn, may comprise memory and/or other storage components, such as optical, magnetic, organic or other memory or disc storage, which can be volatile and/or non-volatile, internal and/or external, and integrated in whole or in part with the processor 56. Data storage 58 preferably contains or is arranged to contain (i) program data 62 and (ii) program logic 64. Although these components are described herein as separate data storage elements, the elements could just as well be physically integrated together or distributed in various other ways. Preferably, the program data 82 will be maintained in data storage 58 separate from the program logic 64, for easy updating and reference by the program logic 64.

Program data 62 may contain information about the video capture devices 18 coupled to the CU 20. For example, program data 62 may contain one or more identifiers for each of the video capture devices 18. As another example, program data 62 may contain capture settings for the video capture devices 18, such as resolution and frame rate. As yet another example, program data 62 may contain recording format information (e.g., compression/encoding format) for the video capture devices 18. Other examples are possible as well.

Program data 62 may also contain information about the video streams received from the video capture devices 18 via links 22. For example, program data 62 may contain data rates for the video streams received from the video capture devices 18. As another example, program data 62 may contain intraframe and/or interframes rates for the video streams received from the video capture devices 18. As yet another example, program data 62 may contain a number of intraframes, interframes, and total frames in the video streams received from the video capture devices 18. Other examples are possible as well.

Program data 62 may further contain information about the communication link 14. For example, program data 62 may contain a measurement of total capacity of the communication link 14, which may be represented as maximum bandwidth of the communication link 14. As another example, program data 62 may contain information about the respective level of QoS that is currently being provided to each video capture device 18. In this respect, the level of QoS information may include indicators of a bandwidth amount and/or priority level being provided to each video capture device 18. Other examples are possible as well.

Program data 62 may additionally contain various predefined values for the CU 20. For example, program data 62 may contain a predefined minimum threshold intraframe rate and/or a predefined minimum threshold number of consecutive intraframes, which the CU 20 may use when determining whether to adjust the QoS over the communication link 14. As another example, program data 62 may contain predefined thresholds and/or amounts of QoS, which the CU 20 may use when adjusting the QoS over the communication link 14. Other examples are possible as well.

Program logic 64 preferably comprises machine language instructions that may be executed or interpreted by processor 56 to carry out functions according to examples of the present invention, including the functions described with reference to FIG. 2. It should be understood, however, that the program logic 64 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 64 may be executable by the processor 56 to (i) provide each of the video capture devices 82 a respective level of QoS over the communication link 14, (ii) receive a first video stream from a first video capture device 18*a* via the first communication interface 52, (iii) detect a predefined minimum threshold rate of intraframes in the first video stream, and (iv) in response to detecting the predefined minimum threshold rate of intraframes, adjust QoS over the communication link 14 to increase a respective level of QoS provided to the first video capture device 18*a*. Additionally, the program logic 64 may be executable by the processor 56 to send the first video stream via the second communication interface 54 over the communication link 14 with the increased respective level of QoS. Additionally yet, the program logic 64 may be executable by the processor 56 to subsequently adjust the QoS over the communication link 14 to decrease the respective level of QoS provided to the first video capture device 18*a*, such as when the first video capture device's intraframe rate decreases and/or a second video capture device's intraframe rate increase. The program logic 64 may be executable by the processor 56 to perform various other functions as well.

Figure 4:
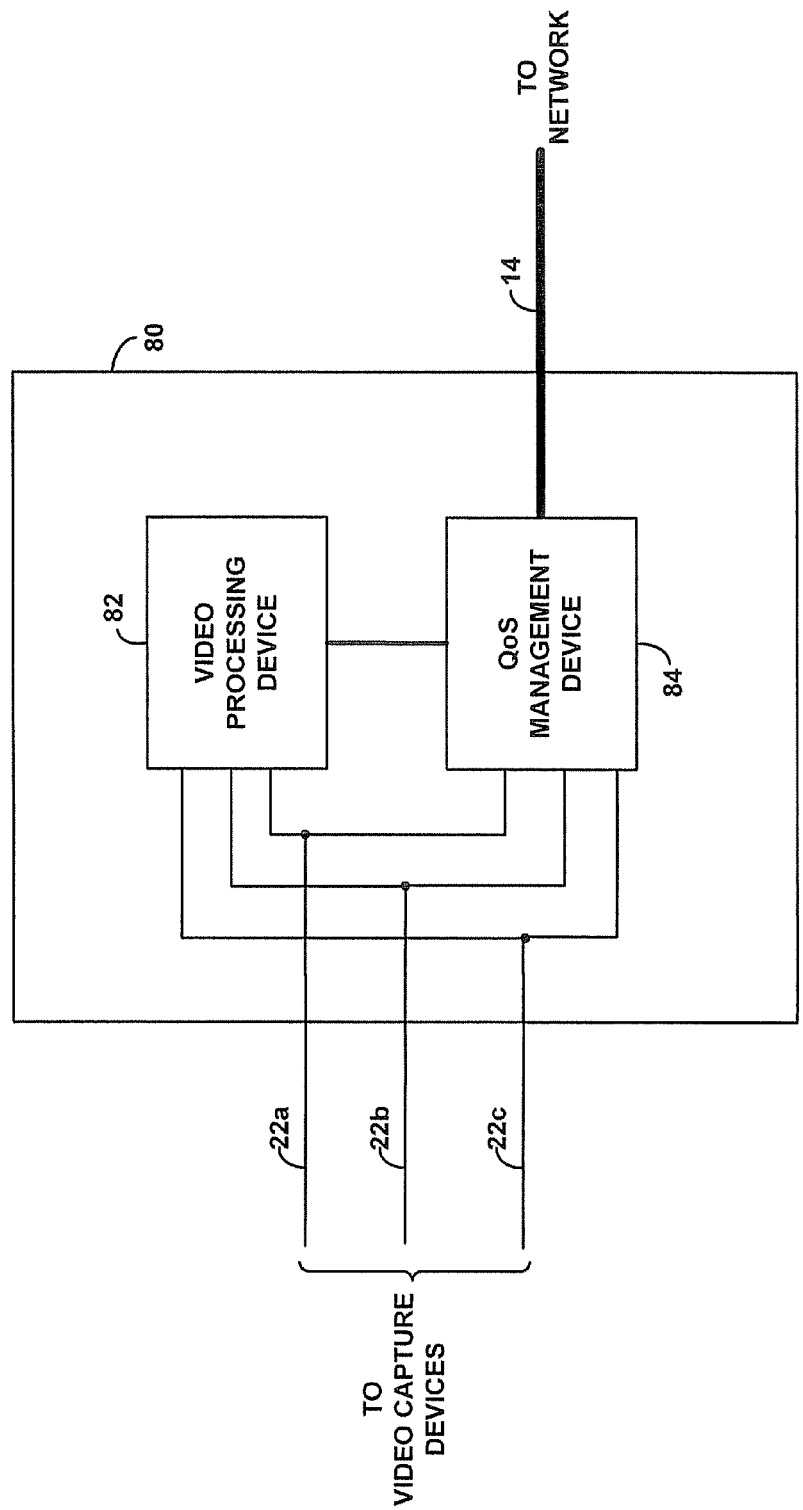
FIG. 4 is a simplified block diagram of a second exemplary control unit, showing functional components that can operate to carry out aspects of the exemplary embodiment.

FIG. 4 is a simplified block diagram of a second exemplary CU 80, showing functional components that can operate to carry out aspects of the present invention. As shown, the second exemplary CU 80 may include, without limitation, a video processing device 82 coupled to a QoS management device 84. Although FIG. 4 depicts the video processing device 82 and the QoS management device 84 as located within a single component 80, it should be understood that the video processing device 82 and QoS management device 84 may be separate components that communicate via a communication link and/or a network.

The video processing device 82 may be coupled to the video capture devices 18 via links 22. As such, the video processing device 18 may be operable to receive and/or monitor video streams from the video capture devices 18. For example, the video processing device 18 may receive and/or monitor a first video stream from the first video capture device 18*a*. Further, the video processing device 18 may be operable to detect a predefined minimum threshold rate of intraframes in a given video stream, such as the first video stream. Further yet, the video processing device 18 may be operable to send the QoS management device 84 an indication that the predefined minimum threshold rate of intraframes has been detected in a given video stream from a given video capture device.

The QoS management device 84 may be coupled to both the network 16 via communication link 14 (and optionally via an external transceiver) and the video capture devices 18 via link 22. As such, the QoS management device 84 may be operable to (i) receive video streams from the video capture devices 18 (ii) provide each of the video capture devices 18 a respective level of QoS over the communication link 14, and (iii) send video streams received from the video capture devices 18 over the communication link 14 according to the respective levels of QoS. Further, the QoS management device 84 may be operable to receive from the video processing device 82 the indication that the predefined minimum threshold rate of intraframes has been detected in a given video stream, and responsively adjust QoS over the communication link 14 to increase a respective level of QoS provided to the given video capture device. Further yet, the QoS management device 84 may be operable to subsequently adjust the QoS over the communication link 14 to decrease the respective level of QoS provided to the given video capture device.

Exemplary embodiments of the present invention have been described above. Those skilled in the art will understand, however, that changes and modifications may be made to the embodiments described without departing from the true scope and spirit of the present invention, which is defined by the claims.

We claim:

1. A method of managing quality of service for a plurality of video capture devices coupled to a network via a common communication link, the method comprising:
   providing each of the plurality of video capture devices a respective level of quality of service over the common communication link;
   receiving a first video stream from a first video capture device of the plurality of video capture devices over a first communication link, wherein the first video stream comprises one or more frames;
   detecting a predefined minimum threshold rate of intraframes in the first video stream;
   in response to detecting the predefined minimum threshold rate of intraframes, adjusting quality of service over the common communication link to increase a first level of quality of service provided to the first video capture device; and
   sending the first video stream to the network over the common communication link with the increased first level of quality of service.

2. The method of claim 1, wherein detecting the predefined threshold rate of intraframes comprises:

calculating a rate of intraframes in the first video stream; and comparing the calculated rate of intraframes in the first video stream to the predefined minimum threshold rate of intraframes.

3. The method of claim 2, wherein calculating the rate of intraframes in the first video stream comprises:
determining a first number of intraframes received during a given time period;
determining a second number of all frames received during the given time period; and
dividing the first number by the second number.

4. The method of claim 2, wherein comparing the calculated rate of intraframes in the first video stream to the predefined minimum threshold rate of intraframes comprises comparing the calculated rate of intraframes in the first video stream to the predefined minimum threshold rate of intraframes only after first receiving a minimum threshold number of frames of the first video stream.

5. The method of claim 1, wherein detecting the predefined minimum threshold rate of intraframes in the first video stream comprises detecting a predefined number of consecutive intraframes in the first video stream.

6. The method of claim 1, wherein the adjusting quality of service over the common communication link to increase the first level of quality of service provided to the first video capture device comprises:
decreasing a second level of quality of service provided to a second video capture device by a given amount, wherein the second video capture device produces a second video stream; and
correspondingly increasing the first level of quality of service provided to the first video capture device by the given amount.

7. The method of claim 6, wherein the given amount is selected from a group consisting of:
a predefined amount;
an amount in proportion to a rate of intraframes in the first video stream; and
an amount in proportion to a rate of intraframes in the second video stream.

8. The method of claim 1, wherein the adjusting quality of service over the common communication link to increase the first level of quality of service provided to the first video capture device comprises one or more of:
reallocating bandwidth of the common communication link to increase a respective amount of bandwidth allocated to the first video capture device;
increasing a level of priority provided to the first video capture device; and
adjusting capture settings of the first video capture device.

9. The method of claim 1, wherein the providing each of the plurality of video capture devices a respective level of quality of service over the common communication link comprises allocating a respective amount of bandwidth of the common communication link to each of the plurality of video capture devices, and wherein adjusting quality of service over the common communication link to increase the first level of quality of service provided to the first video capture device comprises reallocating bandwidth of the common communication link to increase a first amount of bandwidth allocated to the first video capture device.

10. The method of claim 9, wherein the reallocating bandwidth of the common communication link to increase the first amount of bandwidth allocated to the first video capture device comprises:

deallocating a given amount of bandwidth from a second video capture device; and
correspondingly allocating the given amount of bandwidth to the first video capture device.

11. The method of claim 9, wherein the reallocating bandwidth of the common communication link to increase the first amount of bandwidth allocated to the first video capture device comprises:
allocating an unallocated amount of bandwidth of the common communication link to the first video capture device.

12. The method of claim 1, further comprising:
subsequently adjusting quality of service over the common communication link to decrease the first level of quality of service provided to the first video capture device.

13. The method of claim 12, wherein the adjusting quality of service over the common communication link to decrease the first level of quality of service provided to the first video capture device comprises:
determining that the predefined minimum threshold rate of intraframes has not been detected in the first video stream during a predefined time period; and
responsively adjusting quality of service over the common communication link to decrease the first level of quality of service provided to the first video capture device.

14. The method of claim 1, further comprising:
receiving a second video stream from a second video capture device of the plurality of video capture devices over a second communication link, wherein the second video stream comprises one or more frames;
detecting the predefined minimum threshold rate of intraframes in the second video stream; and
in response to detecting the predefined minimum threshold rate of intraframes in the second video stream, adjusting quality of service over the common communication link to increase a second level of quality of service provided to the second video capture device.

15. The method of claim 1, further comprising:
receiving a second video stream from a second video capture device of the plurality of video capture devices over a second communication link, wherein the second video stream comprises one or more frames;
determining that a rate of intraframes in the second video stream exceeds a rate of intraframes in the first video stream; and
in response to determining that the rate of intraframes in the second video stream exceeds the rate of intraframes in the first video stream, adjusting quality of service over the common communication link to (i) increase a second level of quality of service provided to the second video capture device and (ii) decrease the first level of quality of service provided to the first video capture device.

16. A control unit comprising:
a first communication interface for communicating with a plurality of video capture devices;
a second communication interface for communicating with a network via a common communication link;
a processor,
data storage; and
program instructions stored in the data storage and executable by the processor to carry out functions including:
providing each of the plurality of video capture devices a respective level of quality of service over the common communication link;
receiving, via the first communication interface, a first video stream from a first video capture device of the plurality of video capture devices, wherein the first video stream comprises one or more frames;

detecting a predefined minimum threshold rate of intraframes in the first video stream;

in response to detecting the predefined minimum threshold rate of intraframes, adjusting quality of service over the common communication link to increase a first level of quality of service provided to the first video capture device; and sending to the network over the common communication link, via the second communication interface, the first video stream with the increased first level of quality of service.

17. The control unit of claim 16, wherein the video capture devices comprise digital camcorders, and wherein the communication link comprises a wireless satellite link.

18. The control unit of claim 16, further comprising program instructions stored in the data storage and executable by the processor to carry out functions including:

adjusting quality of service over the communication link to decrease the first level of quality of service provided to the first video capture device.

19. A communication system comprising:

a plurality of video capture devices;

a network; and a control unit, wherein the control unit is communicatively coupled to the plurality of video capture devices via respective communication links, wherein the control unit is communicatively coupled to the network via a common communication link, and wherein the control unit is operable to (i) provide each of the plurality of video capture devices a respective level of quality of service over the communication link, (ii) receive a first video stream from a first video capture device of the plurality video capture devices over a first communication link, (iii) send the first video stream to the network over the common communication link according to a first level of quality of service provided to the first video capture device, (iv) detect a predefined minimum threshold rate of intraframes in the first video stream from the first video capture device, and (v) in response to detecting the predefined minimum threshold rate of intraframes in the first video stream, adjust quality of service over the common communication link to increase the first level of quality of service provided to the first video capture device.

20. The system of claim 19, wherein the control unit comprises:

a video processing device communicatively coupled to a quality of service management device, wherein the video processing device is communicatively coupled to the plurality of video capture devices via the respective communication links, wherein the video processing device is operable to (i) monitor the first video stream from the first video capture device, (ii) detect the predefined minimum threshold rate of intraframes in the first video stream from the first video capture device, and (iii) send to the quality of service management device an indication that the predefined minimum threshold rate of intraframes has been detected in the first video stream, wherein quality of service management device is communicatively coupled to the plurality of video capture devices, wherein the quality of service management device is communicatively coupled to the network via the common communication link, and wherein the quality of service management device is operable to (i) provide each of the plurality of video capture devices the respective level of quality of service over the common communication link, (ii) receive the first video stream from the first video capture device over the first communication link, (iii) send the first video stream over the common communication link according to the first level of quality of service, (iv) receive from the video processing device the indication that the predefined minimum threshold rate of intraframes has been detected in the first video stream, and (iv) in response to receiving the indication, adjust quality of service over the common communication link to increase the first level of quality of service provided to the first video capture device.

21. The system of claim 19, wherein the plurality of video capture devices and the control unit are located remotely from the network.

22. The system of claim 19, wherein the plurality of video capture devices comprises a plurality of camera devices.

* * * * *